Nov. 26, 1946.   J. A. VAN DEN AKKER   2,411,672
ELECTRICAL CONTROL SYSTEM
Original Filed Sept. 2, 1941    9 Sheets-Sheet 2
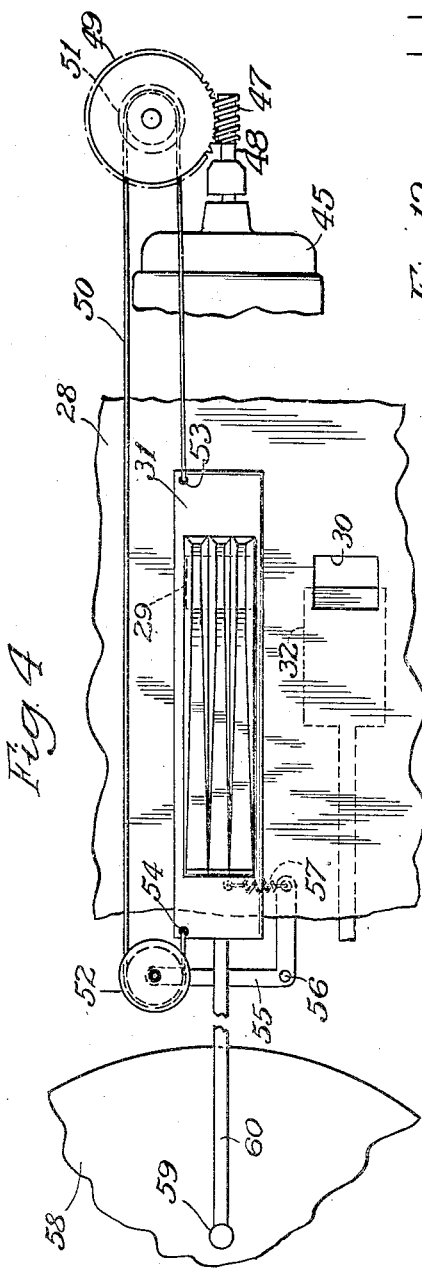
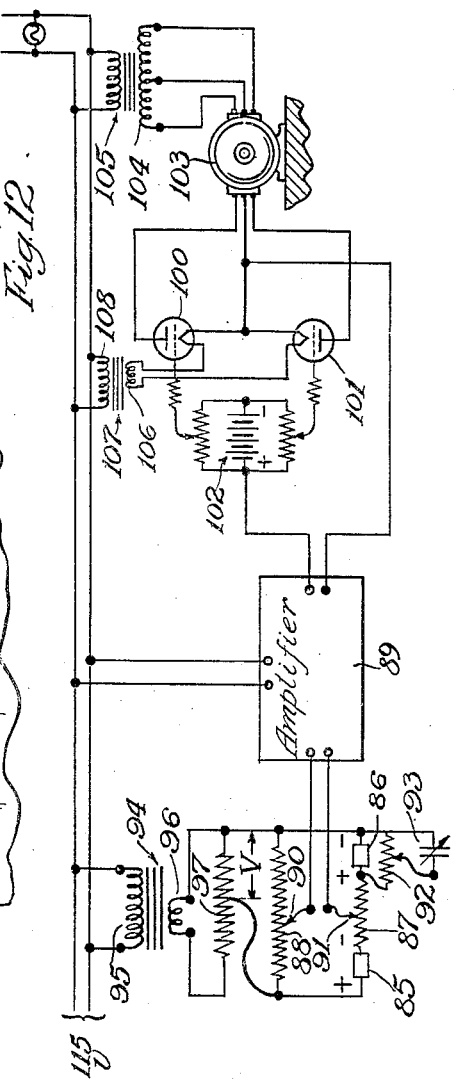
Inventor:
Johannes A. Van den Akker
By Soans, Pond & Anderson
Attorneys Nov. 26, 1946.   J. A. VAN DEN AKKER   2,411,672
ELECTRICAL CONTROL SYSTEM
Original Filed Sept. 2, 1941   9 Sheets—Sheet 3
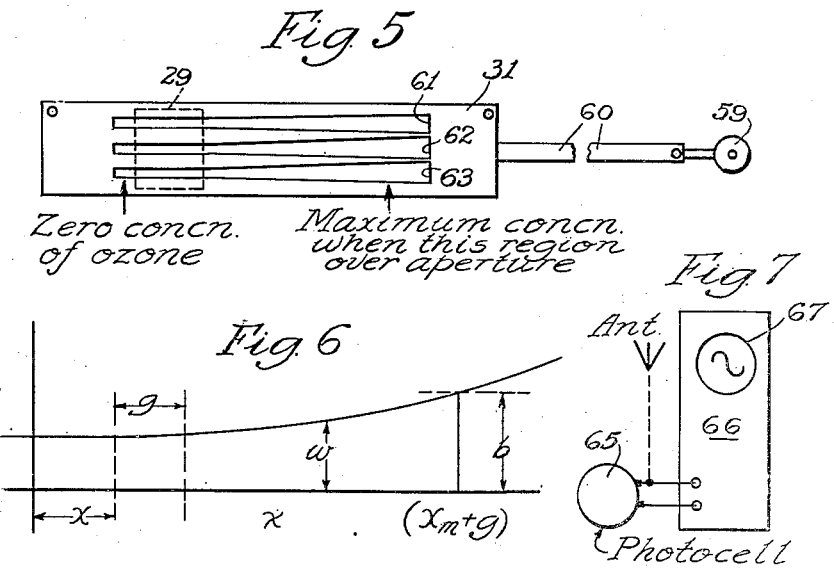
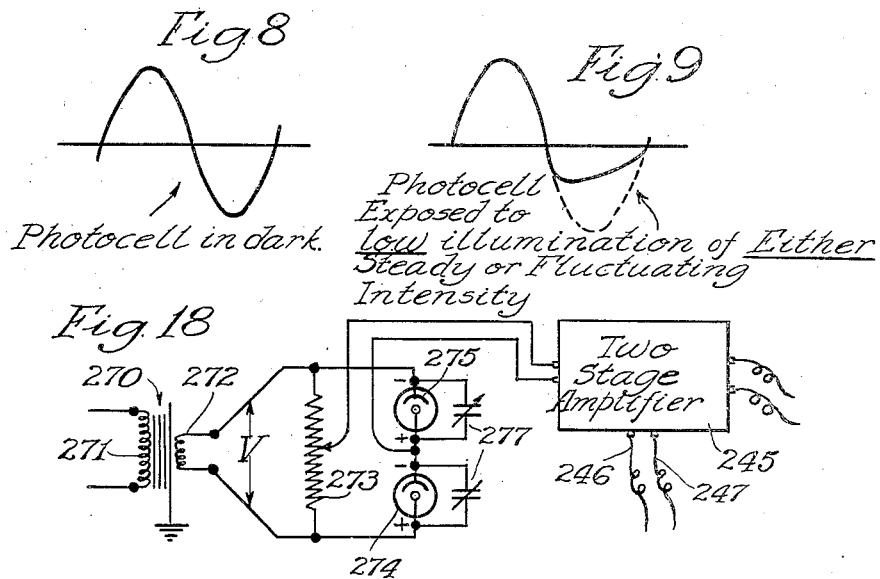
Inventor:
Johannes A. Van den Akker
By Soans, Pond & Anderson
Attorneys Nov. 26, 1946.  J. A. VAN DEN AKKER  2,411,672
ELECTRICAL CONTROL SYSTEM
Original Filed Sept. 2, 1941  9 Sheets-Sheet 4
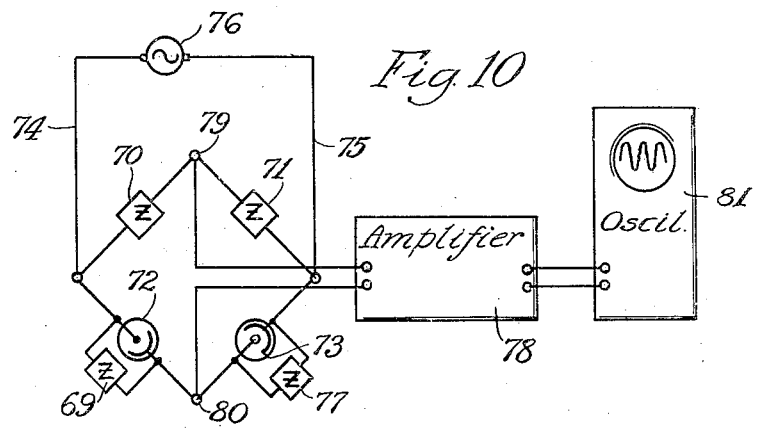
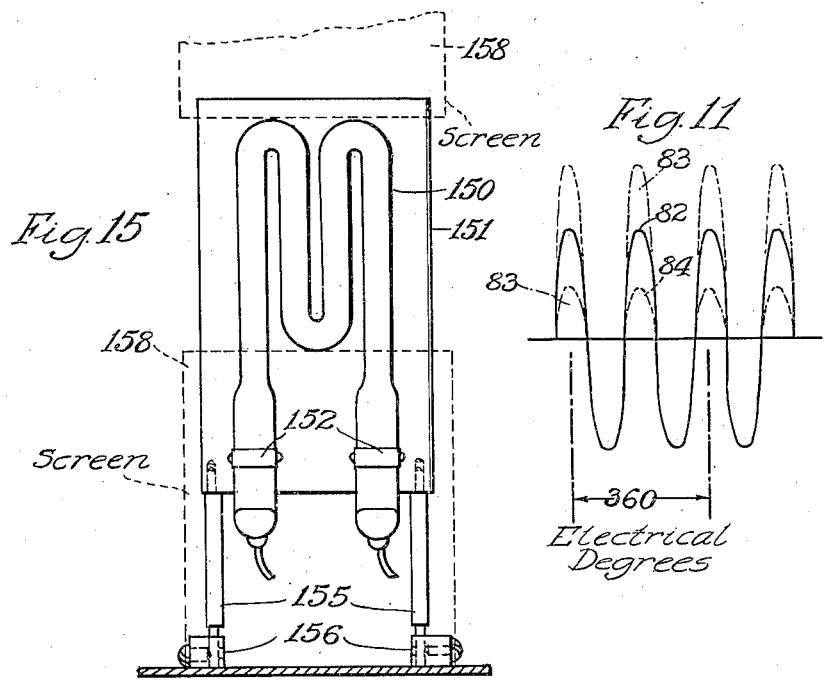
Inventor:
Johannes A. Van den Akker
By Joans, Pond & Anderson
Attorneys

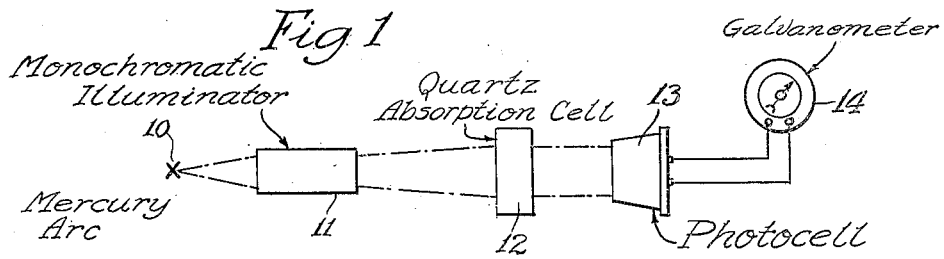
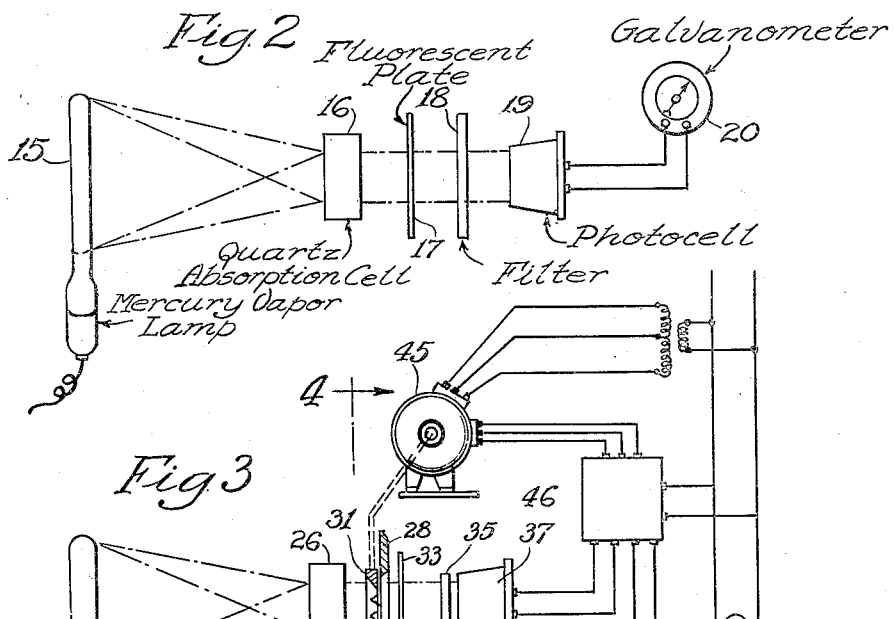
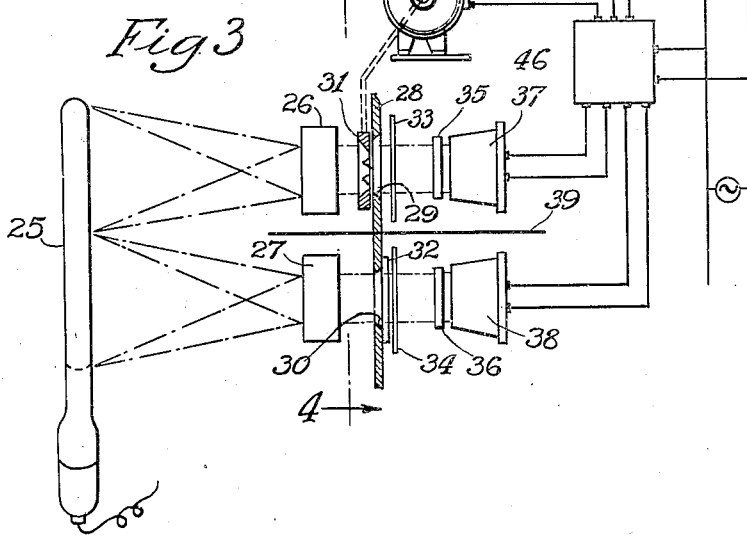

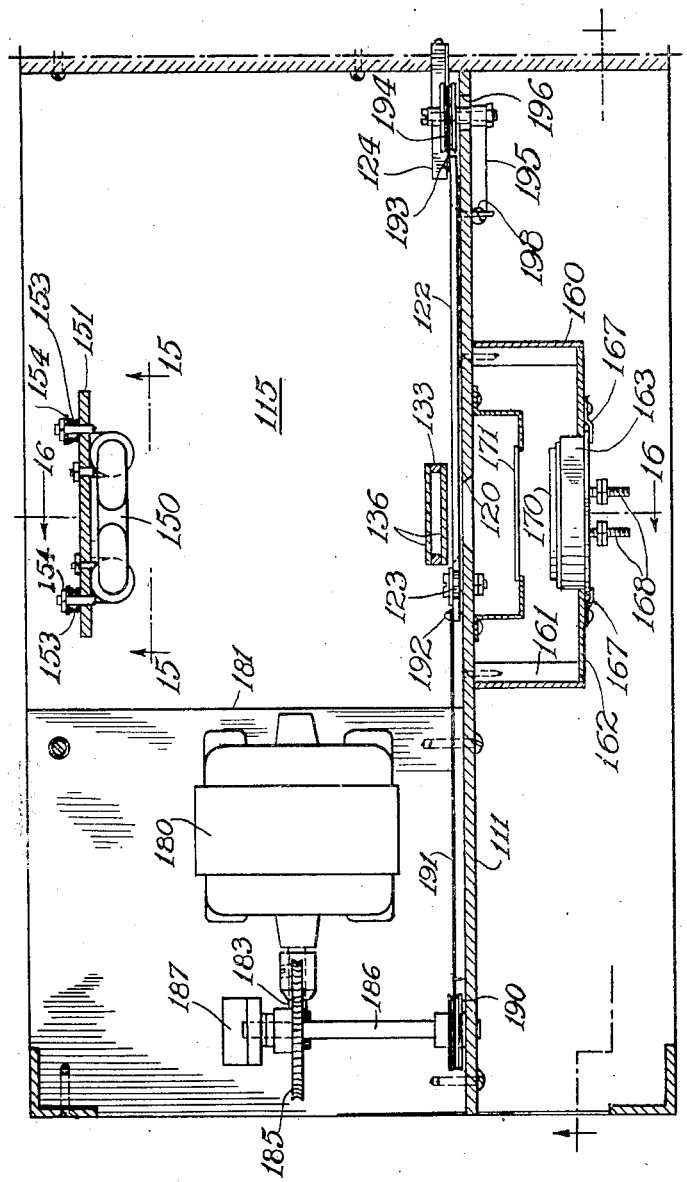

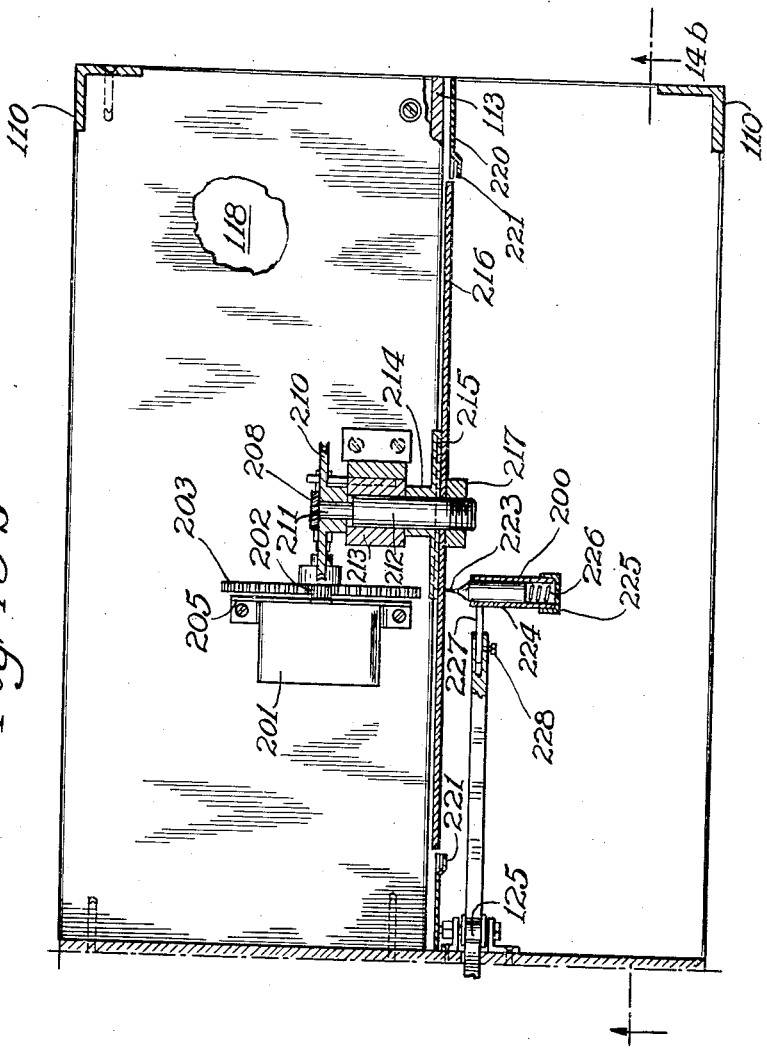

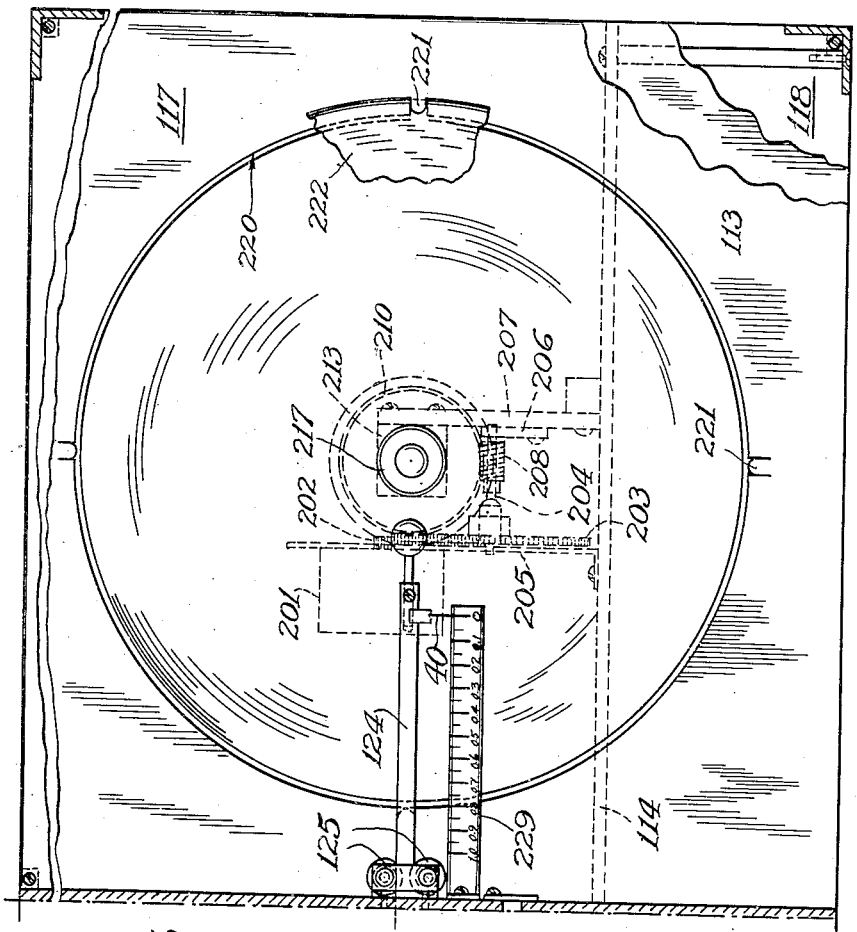

Patented Nov. 26, 1946

2,411,672

UNITED STATES PATENT OFFICE 2,411,672

ELECTRICAL CONTROL SYSTEM

Johannes A. Van den Akker, Appleton, Wis., assignor to The Institute of Paper Chemistry, a corporation of Wisconsin Original application September 2, 1941, Serial No. 409,174. Divided and this application October 28, 1943, Serial No. 507,958

9 Claims. (Cl. 250—41.5)

My invention relates, generally, to apparatus for measuring and recording concentrations of substances which have the property of absorbing light energy of certain wavelengths, the apparatus being particularly adapted to measure and record small concentrations of such substances. As will hereinafter appear, the disclosed embodiment of the invention includes a new and useful light conversion and selection system, photometer, and electrical circuit, each of which serves as one of the component parts of the concentration recording apparatus, but which are not limited solely to use with this apparatus. This application is a division of my co-pending application, Serial No. 409,174, which was filed on September 2, 1941, and which is assigned to the assignee of this application. My earlier application matured into Patent No. 2,350,001 on May 30, 1944.

It is a known scientific fact that certain substances have the property of strongly absorbing light of certain wavelengths, particularly in the ultraviolet region of the spectrum. Examples of gases and vapors having such a property are ozone, sulphur dioxide, mercury vapor, chlorine, perchloroethylene, phosgene, and a fairly large group of other gases and vapors. Examples of solutes which in solution have the property of absorbing light of certain wavelengths are potassium dichromate, amino disulfonic acids, and sodium benzoate. In general, light energy absorption by these various substances is proportional to, or bears a definite relation to, their concentration.

The present invention, making use of this light absorption principle, provides an inexpensive and practical concentration recorder for accurately measuring and simultaneously recording concentrations of substances having this particular property of appreciable absorption for light radiation of certain wavelengths. Although there is some literature treating in a general way on this phenomenon of light absorption by certain substances, and some progress has been made in developing apparatus for only measuring or indicating the concentrations of such substances depending upon their particular light absorption property, it does not appear that there has been any substantial progress made in developing apparatus for both measuring and recording in a continuous manner the concentrations of such substances depending upon their light absorption properties.

Accordingly, the object of my invention, generally stated, is to provide an inexpensive, practical apparatus for measuring and continuously recording in an accurate manner the concentration of certain gases, vapors, and solutes having the property of absorbing to an appreciable extent light radiation of certain particular wavelengths.

A specific object of this invention is to provide an inexpensive and practical concentration recorder which is particularly adapted to accurately measure and record small concentrations of ozone.

Another object of this invention is the provision of an inexpensive light conversion and selection system which makes possible the use of a commercial light source or lamp which emits light in a plurality of wave bands as a source of light energy in a single one of the emitted bands. This light conversion and selection system is particularly adapted for use as part of my improved concentration recorder but may be put to certain other important applications.

In obtaining maximum sensitivity of response in the apparatus of the present invention, an electrical bridge circuit has been provided which produces large changes in wave form in response to relatively small changes in light flux. This bridge circuit is particularly adapted to control gas-filled electric valves, and although it is particularly adapted for use in connection with concentration recorders embodying my invention, it may be advantageously employed in connection with other applications.

The nature and principles of my invention may be more fully understood from the following detailed description of an ozone concentration recorder which forms one embodiment of the invention. Extended tests have shown that this ozone concentration recorder is commercially practical and will accurately measure and record small concentrations of ozone in a very satisfactory manner.

In the interests of simplification, the detailed description of the selected embodiment of the invention will be preceded by a brief discussion of the basic principles of operation thereof taken in connection with suitable diagrammatic drawings.

In the drawings:

Fig. 1 is a diagram of a simple basic system by which the concentration of a substance may be measured depending upon its property of absorbing light radiation of a particular wavelength;

Fig. 2 is a diagram of a system similar to that shown in Fig. 1, but employing the light conversion and selection system of the present invention instead of a monochromatic illuminator;

Fig. 3 is a comprehensive diagrammatic view of a concentration recorder embodying the features of the present invention;

Fig. 4 is a view taken generally on line 4—4 of Fig. 3;

Fig. 5 is a diagrammatic view of a photometer aperture forming an important part of the present invention;

Fig. 6 is a mathematical diagram by which the principles of construction and design of the photometer of Fig. 5 may be explained;

Figs. 7, 8 and 9 are electrical diagrams or wave form sketches by means of which certain electrical observations important in connection with the electrical bridge circuit of the present invention may be explained;

Fig. 10 is a diagram of a light-sensitive electrical bridge circuit adapted to produce large changes in wave form in response to small relative changes in illumination of a pair of photocells and forming an important feature of my present invention;

Fig. 11 is a diagram or sketch showing changes in wave form produced by the electrical bridge circuit of Fig. 10;

Fig. 12 is a diagram showing an electrical control system by which a reversible motor may be controlled in response to changes in wave form produced by an electrical bridge circuit embodying the essentials of the bridge circuit of Fig. 10;

Figs. 13a and 13b are horizontal sectional views of a successfully operated and tested ozone concentration recorder instrument made in accordance with the principles of the present invention, Figs. 13a and 13b together forming a complete horizontal section through this apparatus;

Fig. 14a is a vertical sectional view taken on line 14a—14a of Fig. 13a;

Fig. 14b is a vertical sectional view taken on line 14b—14b of Fig. 13b;

Fig. 15 is an elevational view of a mercury vapor lamp taken on line 15—15 of Fig. 13a;

Fig. 16 is a vertical sectional view taken on line 16—16 of Fig. 13a;

Figure 17:
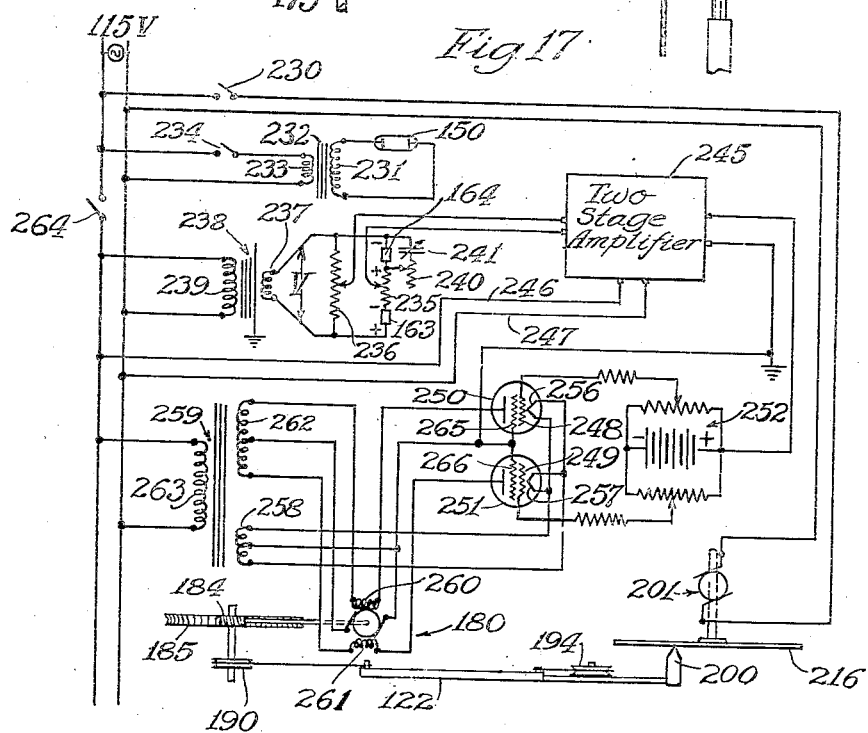

Fig. 17 is a circuit diagram of the electrical control system for the ozone concentration recorder instrument in Figs. 13a, 13b, 14a and 14b; and Fig. 18 is a diagram of a modified form of light-sensitive electrical bridge which has been advantageously substituted for the electrical bridge of the electrical control system shown in Fig. 17. In the electrical bridge of Fig. 18 the photoelectric cells are of the photo-emissive type, whereas in Fig. 17 the photoelectric cells are of the blocking-layer type.

Ozone gas has the ability to strongly absorb ultraviolet light of certain wavelengths. In particular, the absorption by ozone gas of light radiation in the 253.1 mmu line of the mercury spectrum is exceedingly strong, the extinction coefficient being 149 cm.$^{-1}$, under standard conditions of temperature and pressure. That is, a layer of ozone having a thickness of 1 cm. will, under standard conditions of temperature and pressure, reduce the intensity of 253.7 mmu radiation to 1/10$^{149}$. A Läuchli (Z. Physik, 53:92 (1929)), reported extinction coefficients $a$ for ozone gas under standard conditions of normal pressure and temperature, as follows:

Table I

| Wavelength: | 237.8 | 248.2 | 253.7 | 265.2 | 280.4 | 296.7 | 312.5 | 334.1 | mmu |
|---|---|---|---|---|---|---|---|---|---|
| $a$: | 100.5 | 141. | 149. | 123. | 45.6 | 6.9 | 0.96 | 0.07 | cm.$^{-1}$ |

The extinction coefficient $a$ is defined by the equation:

(1) $$I = I_0 10^{-ah}$$

where $I_0$ and $I$ are, respectively, the intensities of incident and transmitted radiation, $a$ is the extinction coefficient, and $h$ is the thickness of the layer of ozone gas in centimeters. Thus transmittance T of a quartz cell containing ozone gas may be expressed by the equation (2) $$T = \frac{I}{I_0} = 10^{-\alpha \rho h}$$

where $\rho$ is the mass of ozone per cubic centimeter, and $\alpha$ is the absorption coefficient per unit concentration and per unit thickness of gas. Under standard conditions of temperature and pressure, $\rho = 0.00214$ g./cc.; therefore $$\alpha = a/\rho = 149/0.00214 = 69{,}700 \text{ cm.}^2/\text{g.}$$

From this, $\rho$ may be expressed by the equation:

(3) $$\rho = (1/\alpha h) \log_{10} (1/T)$$

Applying the foregoing data, it will be seen that the system shown in Fig. 1 can be used to measure the concentration of ozone gas. Referring to Fig. 1, a mercury arc, indicated diagrammatically at 10, is used as a source of 253.7 mmu radiation. The radiation of 253.7 mmu wavelength is isolated from radiation of other wavelengths emitted from the arc 10 by a quartz monochromatic illuminator, indicated diagrammatically at 11. An absorption cell 12, through which ozone gas may be circulated, is placed in line with the monochromatic illuminator 11 so as to receive 253.7 mmu radiation transmitted therethrough. Radiation passing through the cell 12 is received by a photocell 13 adapted to be sensitive to ultra-violet light through the use of fluorescent screen (not shown) which may be prepared, for example, by dipping plain transparent Cellophane in a solution of Uranine B dye. The system is completed by a galvanometer, indicated diagrammatically at 14, having its terminals connected with the terminals of the photocell 13.

In operation, as 253.7 mmu radiation passes through the absorption cell 12 its intensity is reduced to an extent depending upon the concentration of ozone therein. In turn, the photo-current produced by the photocell depends upon the intensity of the 253.7 mmu radiation incident thereon. Accordingly, the amount of deflection of the galvanometer 14 will depend upon the concentration of the ozone circulated through the absorption cell 12.

To calibrate the apparatus, a table of galvanometer deflections with corresponding ozone concentrations may be prepared for the system of Fig. 1 as follows:

As above stated, the mass of ozone per cubic centimeter $\rho$ is related to the transmittance T in accordance with Equation 3.

$$\rho = (1/h) \log_{10} (1/T)$$

Now since $\alpha$ and $h$ are constant, and T is proportional to the deflection D of the galvanometer when $I_0$ is constant, we have Equation —

(4) $$\rho = k_1 \log_{10} (1/D)$$

The value of $k_1$ may be determined by observing the deflection $D_1$ for a known concentration $\rho_1$ of ozone, then substituting these known values in Equation 4 and solving for $k_1$. Having determined $k_1$, a calibration table for the system may be calculated by substituting different values for D and solving for corresponding values for $\rho$.

By using absorption cells of different gas thickness $h$, ozone concentrations in different ranges can be measured with good accuracy.

Although the ozone concentration indicating system of Fig. 1 is successful in operation from a scientific standpoint, it necessitates the use of the monochromatic illuminator 11. Accordingly, to eliminate this piece of apparatus, the system shown in Fig. 2 was provided.

Referring to Fig. 2, a mercury vapor lamp 15 is shown which serves as a source of ultraviolet light for the system. A Westinghouse "Sterilamp" having an M-shape was found to serve very satisfactorily as this mercury vapor lamp 15. Over 88 per cent of the radiation from the lamp 15 is concentrated in the 253.7 mmu line of the mercury spectrum and the detailed distribution of the energy in the various lines thereof is given in the following table:

Table II

| Wavelength, mmu | Relative energy |
| --- | --- |
| 253.7 | 11.3 |
| 265.2 | 0.032 |
| 280.4 | 0.011 |
| 289.4 | 0.016 |
| 296.7 | 0.065 |
| 302.2 | 0.043 |
| 312.9 | 0.34 |
| 365.4 | 0.30 |
| 404.7 | 0.36 |
| 435.9 | 1.09 |
| 546.1 | 0.60 |
| 578.0 | 0.13 |

A quartz absorption cell 16 through which ozone gas may be circulated is disposed in front of the lamp 15, and a glass plate 17 coated with a thin layer or deposit of cadmium borate phosphor is placed in line with the cell 16 to receive radiation transmitted therethrough. The cadmium borate phosphor is strongly excited by radiation of 253.7 mmu wavelength, is weakly excited by near ultraviolet light, and receives no excitation at all from visible light. When excited by ultraviolet light alone, the cadmium borate phosphor fluoresces in the orange and red part of the spectrum.

According to R. N. Thayer and B. T. Barnes (J. Optical Soc. Am. 29:131 (March, 1939)), the spectral excitation curve of cadmium borate phosphor is negligible for wavelengths greater than approximately 380 mmu and, in going toward shorter wavelengths, rises very steeply, being very substantial at a wavelength of 253.7 mmu. When the values for relative energy given in Table I are multiplied by the spectral excitation values given by Thayer and Barnes, the excitation due to 253.7 mmu radiation, and excitations due to neighboring lines are obtained as given in the following table:

Table III

| Wavelength, mmu | Relative excitation |
| --- | --- |
| 253.7 | 11,300 |
| 265.2 | 25.0 |
| 280.4 | 6.6 |
| 239.4 | 7.5 |
| 296.7 | 25.0 |
| 302.2 | 15.0 |
| 312.9 | 68.0 |
| 365.4 | 6.0 |

It will be seen from Table III that the relative excitation of the fluorescent plate 17 due to 253.7 mmu radiation is 11,300, whereas that due to the neighboring lines in the ultraviolet has a total of only about 153. Computation shows that the amount of excitation due to radiation emitted from the lamp 15 in the neighboring lines of the mercury spectrum is only 1.4 percent of that due to 253.7 mmu radiation. As can be seen from Läuchli's data in Table I above, these neighboring lines are somewhat absorbed by ozone but, assuming they suffered no absorption (this enables computation of maximum error), an idea of the error involved can be obtained by taking a transmittance value T of the ozone in the absorption cell 16 as equal to 0.500. The observed transmittance would then be $$(5) \quad T = \frac{[11{,}300/2] + 153}{11{,}300 + 153} = 0.5067$$

If this corresponds to a concentration of ozone of 1.00 percent, the observed concentration would be 0.98 percent. This is only an error of 2 percent of the value of the concentration itself. When the concentration of ozone $c = 0.5$ percent, $T = 0.707$; the observed T would be 0.711 and $Sc = -0.008$, or about 1.6 percent of the concentration itself. These discrepencies are satisfactorily small and may be compensated for in calibration of the instrument.

Fluorescent radiation from the plate 17, which is most strong in the red portion of the spectrum, is filtered through a filter 18 before it reaches a photocell 19. The filter 18 may be a Wratten No. 25 filter which excludes or absorbs all direct radiation of wavelength less than 580 mmu, but freely passes radiation of longer wavelength. Hence, the response of the photocell 19 due to the lines 578.0, 546.1, 435.9 mmu, etc., in the system, will be negligible. The residual response due to the visible spectrum of the mercury arc will be due to the very feeble lines in the red and near infra-red. If not accounted for, this radiation in the red and near infra-red portions of the spectrum would give rise to a concentration error of a smallness comparable with that under 2.0 percent discussed above in connection with Equation 5. Instrument calibration may be relied upon to take care of this small error. Accordingly, the photocell 19 (which may be of the blocking-layer type) will give rise to a photocurrent which is primarily dependent upon and responsive to the intensity of 253.7 mmu radiation.

The deflection of a galvanometer 20 connected in series with the photocell 19 will be proportional to the photocurrent produced thereby. With a uniform amount of 253.7 mmu radiation being supplied to the absorption cell 16 from the mercury vapor lamp 15, the photocurrent will be proportional to the intensity of the 253.7 mmu radiation transmitted through the absorption cell 16, and accordingly will vary inversely with the ozone concentration therein. To calibrate the apparatus, a table of galvanometer deflections and corresponding values of ozone concentration may be prepared for the system of Fig. 2 according to the method as described above in connection with the system of Fig. 1.

The systems described above in connection with Figs. 1 and 2 of the drawings serve only to measure or indicate ozone concentrations. Such apparatus, while perhaps suitable for measuring the concentration of ozone in various gas samples from time to time, is inadequate since there are many applications and instances where it is necessary to measure and record the concentrations of ozone and other gases and vapors in a continuous manner. In Figs. 3 and 4 of the drawings, such a system for measuring and recording ozone concentrations in a continuous manner is shown. The general arrangement and broad principles of operation of my concentration recorder may be conveniently understood by a brief, general description thereof taken in connection with Figs. 3 and 4, while a detailed description of the various operating parts and elements thereof can be advantageously given below.

Accordingly, referring to Figs. 3 and 4 of the drawings, there is shown at 25 a mercury vapor lamp, which may be in the form of an M-shaped Westinghouse "Sterilamp," and which serves as a source of ultraviolet light. The light energy distribution characteristics of the vapor lamp 25 have been described above in connection with the mercury vapor lamp 15 of Fig. 2. A pair of quartz-window absorption cells 26 and 27 are placed to the right of the lamp 25 so as to receive ultraviolet light therefrom. The rays of radiation from the lamp 25 to the cells 26 and 27 are indicated in broken line. The upper absorption cell 26 serves as the "active" cell through which ozone gas may be circulated. When the concentration of ozone or other gas or vapor in air is being measured it is not necessary to provide the lower absorption cell 27. However, when the concentration of a solute in a solvent is being measured, the clear solvent should be placed in the lower absorption cell 27.

A plate 28 is placed a short distance to the right of the absorption cells 26 and 27, this plate having two rectangular openings or windows 29 and 30 formed therein. The windows 29 and 30 register with the upper and lower absorption cells 26 and 27, respectively, so that light from the lamp 25 passing through the absorption cells 26 and 27 also passes through the openings 29 and 30. A photometer member 31, the construction and design of which is described in detail hereinafter, is shiftably mounted in front of the upper opening 29. The photometer member 31 and the opening 29 together form a variable photometer aperture for measuring light passing through the upper absorption cell 26. An adjustable shutter member 32 is provided in the back of the lower window 30 which serves to adjust the width thereof.

A pair of the light conversion and selection systems described in connection with the system of Fig. 2 of the drawings are incorporated in the concentration recorder of Fig. 3; that is to say, the system or combination formed by the fluorescent plate 17 and the filter 18 of Fig. 2. In Fig. 3, a cadmium borate phosphor coated plate 33 is positioned to the right of the upper opening 29, while a similar fluorescent plate 34 is positioned to the right of the window 30. The fluorescent plates 33 and 34 may have the same excitation characteristics as the fluorescent plate 17 described in connection with Fig. 2. A pair of red filters 35 and 36 are placed to the right and in back of the fluorescent plates 33 and 34 respectively, so as to receive fluorescent light therefrom. The filters 35 and 36 may be of the Wratten No. 25, or "A" filter type, having the absorption characteristics described in connection with filter 18 of Fig. 2. A pair of photocells 37 and 38 are placed behind the filters 35 and 36, respectively, so as to receive light passing therethrough. A horizontal partition 39 serves to separate the upper set of elements from the lower set so as to prevent interference due to light leakage therebetween.

When the concentration recorder of Fig. 3 is being used to measure and record ozone concentration, the mercury vapor lamp 25 serves as a source of 253.7 mmu radiation. The fluorescent plate 33 and filter 35 forming the upper set of light conversion and selection elements, transform the ultraviolet 253.7 mmu radiation into visible light and isolate the other neighboring lines of the mercury spectrum, so that the response of the upper photocell 37 is substantially entirely due to the amount of 253.7 mmu radiation passing the photometer. The manner in which this light conversion and isolation is accomplished is described above in connection with Fig. 2. Likewise, the fluorescent plate 34 and filter 36, forming the lower set of light conversion and selection elements, convert the ultraviolet 253.7 mmu radiation passing through those elements into visible light, so that the response of the lower photocell 38 will be substantially entirely dependent upon the amount of 253.7 mmu radiation passing through the window 30.

The photocells 37 and 38 comprise part of an electrical control system for controlling a reversible motor 45. The control system for the motor 45 is indicated diagrammatically in Fig. 3 by the box 46. The details of this electrical control system will be fully described below. The electrical control system and the reversible motor 45 are energized from the source of alternating current as indicated by the circuit diagram in Fig. 3.

The reversible motor 45 operates the photometer by shifting the photometer member 31 back and forth in different positions across and in front of the upper opening 29. The driving connection between the motor 45 and the variable aperture member 31 is indicated in Fig. 3 by the broken line connection therebetween. Referring particularly to Fig. 4, this driving relationship between the motor 45 and the variable aperture member 31 is shown in detail. A worm 47 provided on the end of the rotor shaft 48 of the reversible motor 45, serves to drive a worm wheel 49. A cord 50 runs over a pulley 51 on one side of the worm wheel 49 and a second pulley 52 mounted to the left of the photometer member 31. One end of the cord 50 is fastened to the upper right hand corner of the photometer member 31 at 53, and the other end of the cord 50 is fastened to the upper left hand end of the photometer member 31 as indicated at 54. The pulley 52 is carried on a bell-crank lever 55 which is pivotally supported at the point 56. A spring 57 connected to the lower arm of the bell-crank 55 and a rigid part of the recorder, serves to tension the pulley 52 toward the left, thereby maintaining the cord 50 in a taut condition.

The record of the concentration recorder is made on a time-driven chart 58 by a stylus or pen 59 carried on the end of an arm 60 extending from the left hand side of the photometer member 31.

In operation, the concentration recorder is first adjusted for zero reading. When used to measure and record the concentration of ozone in air, this initial adjustment is made with the upper and lower absorption cells 26 and 27 containing air only. It will be understood that the photometer member 31 has different positions ranging from that corresponding to zero ozone concentration to that corresponding to the maximum ozone concentration which the recorder is adapted to measure. In making the zero adjustment the width of the window 30 is regulated by the shutter 32 so that the system will be balanced when the photometer member 31 is in zero position. That is, the width of the lower window 30 is adjusted so that the amount of 253.7 mmu radiation passing therethrough is sufficient to effectively balance the amount of 253.7 mmu radiation passing through the photometer, when the member 31 is in its zero position. After this adjustment has been made, the recorder is in condition to measure and record ozone concentration.

When the concentration recorder is put into operation and ozone is circulated through the upper absorption cell 26, the intensity of 253.7 mmu radiation transmitted through this cell will be reduced in accordance with the concentration of ozone therein. As a result, the amount of 253.7 mmu radiation passing through the photometer will be correspondingly reduced, and with the photometer member 31 in its zero position, will not be sufficient to balance the amount of the same radiation passing through the lower window 30. Accordingly, the control system will be unbalanced, and the reversible motor will be operated so as to shift the photometer member 31 from its zero position to a position where a sufficient amount of the 253.7 mmu radiation is passed to balance that passing through the lower window 30. Thereafter, as the concentration of the ozone circulated through the absorption cell 26 changes from time to time, the photometer member 31 will be shifted from one position to another so as to keep the system in balance. The concentration will be recorded on the chart 58 by the element 59 which shifts with the photometer member 31. The details of the photometer and the electrical control system are described below.

It will be seen that the photometer system of the concentration recorder is of the so-called "null balance type." That is, a definite relationship is maintained between the amount of 253.7 mmu radiation passing through the photometer comprising the photometer member 31 and the opening 29, and the amount of the same wavelength radiation passing through the adjustable lower window or aperture 30. The great advantage afforded by the employment of the "null balance type" of photometer system is that the accuracy of the concentration recorder is not affected by changes in output of radiation from the vapor lamp 25 due to changes in line voltage. The concentration recorder will thus accurately measure and record independently of variation in output from the lamp 25.

*Photometer system*

For accuracy and convenience, it was found desirable to provide a photometer having a linear scale so designed that the amount of shift of the photometer member 31 from its zero position required to balance the system should be a linear or straight-line function of the ozone concentration in the absorption cell 26. Reference may be made to Figs. 5 and 6 of the drawings for a detailed description of the variable aperture member 31. (Fig. 5 is a rear view of the photometer member 31 in respect to its position shown in Figs. 3 and 4 with the opening 29 indicated in broken outline.)

It will be noted that the variable aperture member 31 has three similar elongated openings 61, 62, and 63 of exponential shape formed therein. Three openings 61, 62 and 63 are used so as to reduce photometric error. If a single large opening were used instead, it will be seen, on referring to Fig. 3, that the points of fluorescence on the plate 33 would move from a central area to cover most of the plate 33 on shifting the member 31 from its zero position shown in Fig. 4 to its opposite position where the greatest amount of light is passed thereby. This fanning or widening out of the excited fluorescent area might give rise to a photometric error, since the response of the upper photocell 37 to fluorescent light of given source intensity depends upon the position of the source on the fluorescent plate 33. Theoretically this error would be minimized to a negligible value if a large number of equally spaced openings having parallel axes were cut in the photometer member 31. Since such an arrangement would be impractical, the three elongated openings 61, 62 and 63 were chosen. The photometric error with the three openings has been found to be sufficiently small so that the over-all accuracy of the recorder is not impaired.

The calculation of the shape of the openings 61, 62 and 63, may be explained as follows, with reference to Fig. 6:

$g$=width of the opening 29, $w$=total opening in member 31,

Let $x$=distance on recorder chart=distance of motion of the member 31 from the origin or zero position.

We know that the transmittance of the ozone is:

$T'=10^{-\alpha ct}$, where $\alpha$=extinction coefficient=69,700 cm.$^2$/g.

$t$=thickness of ozone in cm.

$c$=concentration of ozone in g./cm.$^3$.

Since we desire a linear scale, $c=k_2 x$.

The photometric method calls for constant flux of 253.7 mmu radiation going to the fluorescent plate; hence, calling $x_m$ the maximum displacement in operation of the photometer member 31, we may write $$(6) \quad \frac{\int_x^{x+g} f(x)dx}{\int_{x_m}^{x_m+g} f(x)dx} \cdot T' = \text{constant} = T'_{\min}$$

where $T'_{\min}$ is the value of $T'$ at $x_m$ and at maximum recorded concentration. The object is to find a function of $x$ which will satisfy the above integral equation. It is easy to show that the solution is a simple exponential function:

Put $f(x)=Ae^{Bx}$. Then, substituting and integrating, we obtain:

(7)

$$(A/B)(e^{Bg}-1)e^{Bx} = (A/B)(e^{Bg}-1)e^{Bx_m}(e^{-2.303k_2\alpha t x_m}/e^{-2.303k_2\alpha t x})$$

or $$(8) \quad e^{B(x_m-x)} = e^{2.303k_2\alpha t(x_m-x)}$$

and, $$B=2.303k_2\alpha t$$

therefore, $$f(x)=A10^{k_2\alpha t x}$$

when $$x=x_m+g, \quad f(x)=b=A10^{k_2\alpha t(x_m+g)}$$

and hence, $$A=b10^{-k_2\alpha t(x_m+g)}$$

Finally, the equation for the total opening in the exponential opening becomes (9) $\quad f(x) = b10^{-k_2 at(x_m+g-x)}$ We may select as the following values of constants, values which were actually used in the design of the photometer member of a successfully operated ozone recorder instrument to be described hereinafter:

$x_m = 3.5'' = 8.89$ cm.
$g = 2.00$ cm. $= (0.788'')$
$b = 2.20$ cm.
$c_m = (11.8).10^{-6}$g/cc. (equivalent to 1 per cent, based on weight for dry air at 21° C., 75 cm. Hg pressure)
$k_2 = (1.327).10^{-6}$g/cm.$^4$
$t = 0.400$ cm.

With these values, Equation 9 becomes:

(10) $\quad f(x) = (2.20).10^{-0.037/10.89-x}$cm.

Computations were made from Equation 10, and the results are presented in the following table:

*Table IV*

| $x$ (cm.) | $f(x)$ (cm.) |
|---|---|
| −0.5 | 0.835 |
| 0.0 | 0.871 |
| 1.0 | 0.948 |
| 2.0 | 1.031 |
| 3.0 | 1.126 |
| 4.0 | 1.223 |
| 5.0 | 1.332 |
| 6.0 | 1.450 |
| 7.0 | 1.579 |
| 8.0 | 1.718 |
| 9.0 | 1.872 |
| 10.0 | 2.038 |
| 11.0 | 2.220 |
| 12.0 | 2.42 |
| 13.0 | 2.63 |

The values given in Table IV are equally divided between the three parallel elongated openings 61, 62 and 63. In the photometer member designed for the working embodiment of my invention, the axes of the openings 61, 62 and 63 are each separated by a distance of 0.85 cm. The openings 61, 62 and 63 are somewhat longer than 3.5 inches ($x_m$) so as to permit overplay at zero and maximum concentrations. (A distance on the recording chart of exactly 3.5 inches was chosen for the range in ozone concentration of from 0.0 to 1.0 percent.) As indicated in the foregoing theory, all calculations have been based on concentration of ozone expressed in grams per cubic centimeter (g./cc.). Percentage composition, based on weight, is made relative to the density of dry air at 21° C., 75 cm. Hg atmospheric pressure.

In making the above calculations it has been assumed that all of the rays of 253.7 mmu radiation passed through the absorption cell in a direction perpendicular to the quartz windows thereof. In any practical arrangement this condition cannot be completely met and, therefore, the incident rays are not perpendicular to the absorption cell but actually cover a range of angles from zero degrees to a certain maximum value dependent upon the size of the light source, the size of the absorption cell, etc. On the basis of sound theory the error due to this deviation from the ideal picture may be calculated. Such calculations have been made for the dimensions used in the ozone recorder instrument described hereinafter. They showed that the actual cell thickness (inside width) should be 0.98 of the theoretical thickness. Thus, with a theoretical inside cell thickness $t$ of 0.400 cm., the actual inside cell thickness should be 0.4 x 0.98 or 0.392 cm.=0.1543 inch

*Electrical control system*

The electrical control system employed in connection with the concentration recorder diagrammatically shown in Figs. 3 and 4 constitutes an important feature of the invention, and involves the use of a novel type of electrical bridge circuit for controlling gas-filled electric valves. The principles of my electrical control circuit are described below in connection with Figs. 7 through 12.

Referring particularly to Figs. 7, 8 and 9, the following observation was made in experiments with a single blocking-layer photocell on the input of an oscilloscope. With the photocell 65 connected across the input of the oscilloscope 66, as shown, and exposed to an intense source of light showing a strong periodic variation in intensity, a voltage wave of insignificant amplitude was observed on the fluorescent screen 67 of the oscilloscope. However, when the unearthed terminal of the input was connected to a short antenna, as indicated by the broken line, to pick up the sixty-cycle wave, the wave form on the fluorescent screen 67 changed very markedly as sketched in Figs. 8 and 9. In Fig. 8 the sixty-cycle sine wave is shown which is obtained when the photocell 65 is in the dark. However, when the photocell 65 is exposed to low illumination of either steady or fluctuating intensity, the sine wave is materially changed in one half part of the cycle as shown in the sketch of Fig. 9. The broken line part of the sketch in Fig. 9 indicates the normal sine wave pattern. The explanation of the change in sine wave as shown in Fig. 9, is that illumination decreases the shunt resistant across the input terminals of the oscilloscope 66 during one-half of the cycle. Although it was known that the internal resistance of a blocking-layer cell depended upon the intensity of light falling upon the photocell, it was surprising to find that the sensitivity of change of wave form to light was very much greater than the direct photoelectric effect, where a rapidly fluctuating source of light is involved, and one is interested only in the alternating current component. By way of explanation, it appears that the direct photoelectric effect was impaired by the low impedance of the blocking-layer photocell.

It was found that the above observation of the sensitivity of wave form to light of a blocking-layer photocell could be used to provide an electrical bridge circuit which was very sensitive to small relative changes in light flux from two light sources so as to produce large changes in wave form. Such a bridge circuit is shown diagrammatically in Fig. 10 of the drawings.

Referring to Fig. 10, it will be seen that the electrical bridge circuit comprises four legs connected to provide two parallel branches. One pair of the legs or one branch comprises adjustable impedance devices indicated diagrammatically at 70 and 71, and the other pair of legs constitutes the other branch, each leg including a blocking-layer photocell indicated diagrammatically at 72 and 73. The photocells 72 and 73 should be matched for sensitivity, internal resistance and capacitance. Each of the pairs of legs are connected in series circuit relation and the pairs of legs are then connected in parallel to provide a circuit having two parallel branches, as shown. The conductors 74 and 75 serve to connect the bridge with a source of alternating current indicated diagrammatically at 76. Adjustable impedance devices indicated diagrammatically at 69 and 77 may be connected in shunt relation with the photocells 72 and 73 respectively. The adjustable impedance devices 69 and 77 may each include an adjustable resistor and an adjustable capacitor connected together either in series or parallel circuit relationship. The input of an electronic amplifier indicated diagrammatically at 78 may be connected across the common connections 79 and 80 between each of the pairs of legs, as shown. The output of the amplifier 78 is connected to the input of an oscilloscope indicated diagrammatically at 81.

Many interesting effects were observed in connection with this electrical bridge arrangement. When an alternating current voltage, within a range to which the electrical bridge circuit was sensitive, was applied across the bridge from the source 76, and the bridge balanced through the manipulation of the impedance devices 70, 71 and 77, the bridge circuit became very sensitive to small relative changes in light flux gathered by one of the photocells. When the cells 72 and 73 are in darkness, the bridge circuit may be balanced so as to obtain the residual wave 82 sketched in Fig. 11. This residual wave is indicated by the full line having loops of equal amplitude above and below the reference line. Theoretically, if the photocells 72 and 73 were identical and completely matched for sensitivity, internal resistance and capacitance, the residual wave 82 would be a straight line.

The change in wave obtained when one of the photocells receives an increment in light flux or illumination not accompanied by a similar increment received by the other photocell, is indicated by the waves 83 and 84, the wave 83 being designated with dots and dashes, whereas the wave 84 is designated with uniform dashes.

Referring to the sketch of Fig. 11 it will be seen from the waves 83 and 84 that peaks 360 electrical degrees apart, relative to the potential source 76 connected across the parallel branches of the bridge circuit, increase, and alternate peaks (180° phase difference) decrease, when one of the photocells receives an increment in illumination and, vice versa, the alternate peaks rise and the first-mentioned set of peaks decrease when the other photocell receives an increment in illumination. The wave 83 represents the wave obtained when one of the photocells 72 or 73 receives the greater illumination, while the wave 84 represents the wave obtained when the other photocell receives the greater illumination. It should be noted that peaks of the same potential are produced during each half cycle of the potential source 76 when the relative illuminations of the two photocells are at proper values. This is most unexpected, and as will hereinafter appear, most useful phenomena. When light flux to the two cells 72 and 73 is greatly increased, but balance (through only change in relative flux), the residual wave 82 shown in the sketch of Fig. 11 does not change greatly in either amplitude or phase, the change in phase being very small; moreover, the phenomenon is not significantly altered when a strongly pulsating light source (1-tube G. E. Mazda fluorescent lamp) is used.

It was found that the value of the alternating current voltage impressed on the bridge circuit was an important factor. When this voltage was raised to a certain maximum value (two or three volts), depending upon the particular circuit involved, the circuit was no longer sensitive to changes in illumination on the photocells 72 and 73, and an essentially sinusoidal wave form was observed on the screen of the oscilloscope 81. However, when the voltage was again reduced to a value to which the bridge became sensitive, the wave forms shown in connection with sketch of Fig. 11 were again obtained.

It is apparent that the wave form patterns shown in the sketches in Fig. 11 are well suited for direct control of electric valves of the gas-filled type (Thyratron or Grid-glow tubes). The grids or control elements of the Thyratrons should be operated together and the plates operated apart by 180 electrical degrees.

In Fig. 12 of the drawings one type of electrical control system for the concentration recorder of Fig. 3 is shown, employing the electrical bridge circuit principles described above in connection with Fig. 10. Referring to Fig. 12, the blocking-layer photocells 37 and 38 (Fig. 3) are indicated diagrammatically at 85 and 86 in two legs of an electrical bridge circuit. The photocells 85 and 86 are connected in series circuit relation in one branch of the electrical bridge by a resistor 87, and the other branch of the electrical bridge comprises a resistor 88. The input terminals of an amplifier, indicated diagrammatically at 89, are connected between the electrical midpoints of the bridge circuit as indicated at 90 and 91. Since the photocells 85 and 86 cannot ordinarily as a practical matter be perfectly matched for internal resistance or capacitance, an adjustable resistor 92 and a variable capacitor 93 are connected in shunt circuit relationship with one of the photocells 85 or 86.

The bridge circuit may be energized from a transformer, indicated generally at 94, having its primary winding 95 connected for energization from a 115-volt alternating current source, and having a secondary winding 96 of few turns. The secondary winding 96 is connected across the branches of the bridge circuit through an adjustable resistor 97 whereby the voltage V impressed across the bridge may be regulated. The value of the voltage V is ordinarily adjusted to about 0.25 volt.

The resistor 97 is a low resistant potentiometer rheostat having a resistance of the order of 1000 to 2000 ohms, the exact value not being critical. The resistors 87 and 88 may be 1000-ohm potentiometer rheostats, and the resistor 92 may be a 10,000-ohm rheostat. The exact values of the resistance 92 and the capacitance 93 depend upon the degree of difference in impedances of the photocells 85 and 86. It will be understood that these details of the electrical bridge circuit are not critical and that certain other arrangements may be used.

As stated, the wave form pattern obtained with the electrical bridge is well suited for direct control of gas-filled electric valves, of the type commercially available as Thyratrons (General Electric) or Grid-glow tubes (Westinghouse). Accordingly, the output of the amplifier 89 is capacitively coupled to the control grids of two such electric valves 100 and 101, as shown. The grid bias is supplied and the firing points of the electric valves 100 and 101 adjusted, by voltage from a battery indicated diagrammatically at 102 through suitable adjustable resistance, as shown. Only low amplification is necessary, and the amplifier 89 may be of the conventional two-stage type.

The tube 100 is connected in series with one of the field coils (not shown) of a reversible motor 103 while the other tube 101 is connected in series with the other field coil of the reversible motor. The filaments or heater elements of the electric valves 100 and 101 are connected for energization to the secondary winding 106 of a transformer 107, having its primary winding 108 connected across a 115-volt alternating current source. The motor 103 may be of the direct current, fractional horse power type and has one terminal of one of its field coils connected to one side of the secondary winding 104 of a transformer indicated generally at 105, while one terminal of the other field coil is connected to the opposite side of the secondary winding 104. Each of the other terminals of the field coils is connected through one of the tubes 100 or 101 and through the armature of the motor 103 to the center tap of the secondary winding 104.

It will be seen that the control grids of the electron tubes 100 and 101 are operated together while the plates thereof are operated 180 electrical degrees apart. As described in connection with Figs. 10 and 11, small changes in light flux to, or illumination of, either of the blocking-layer photocells 85 and 86 will distort the residual-balance wave of the bridge circuit so as to produce either the wave form 83 or 84 (Fig. 11), depending upon which of the photocells receives the greater illumination. Accordingly, when the balance between the illumination of the photocells 85 and 86 is changed in one direction one of the tubes 100 or 101 will fire, while if the illumination is unbalanced in the opposite direction, the other tube will fire. Since each of the field coils of the reversible motor 103 is connected with one of the electric valves 100 or 101, the motor will run in one direction or the other depending upon which of the tubes is caused to fire. Referring back to the operation of the concentration recorder as shown diagrammatically in Figs. 3 and 4, it will be seen that the bridge circuit will continue to be unbalanced and one of the tubes 100 or 101 will fire until the motor 103 has driven the photometer member to a point where the bridge circuit is again balanced.

Employing the principles of my invention described above, an ozone concentration recorder adapted to measure the concentration of ozone in air up to 1.0 per cent was constructed. The details of this recorder are described below in connection with the remaining figures of the drawings.

*Design of ozone recorder*

Referring to Figs. 13a, 13b, 14a and 14b, the recording instrument is housed in a box the frame elements of which comprise angle iron members 110 welded together at the eight corners of the box. The box is 29 inches long, 10 inches wide, from front to back, and 13 inches high. Three vertical partitions 111, 112 and 113, and one horizontal partition 114 divide the interior of the box into four compartments. The four compartments may be designated as "light source compartment" 115, "photocell compartment" 116, "recorder compartment" 117, and "rectifier compartment" 118. It will be noted that the rectifier compartment 118 is that portion of the instrument which is under the partition 114 and back of the partition 113. The recorder compartment includes that portion in front of the partition 113 and extends over the rectifier compartment 118. The side walls (not shown) of the instrument may be constructed with lightweight sheet steel, bent at the corners and bolted to the steel frame. The back wall should be hinged so that free access to the recorder and rectifier compartments 117 and 118 may be had. The front wall should contain an opening so as to permit ready access to the recording chart.

Figure 14A:
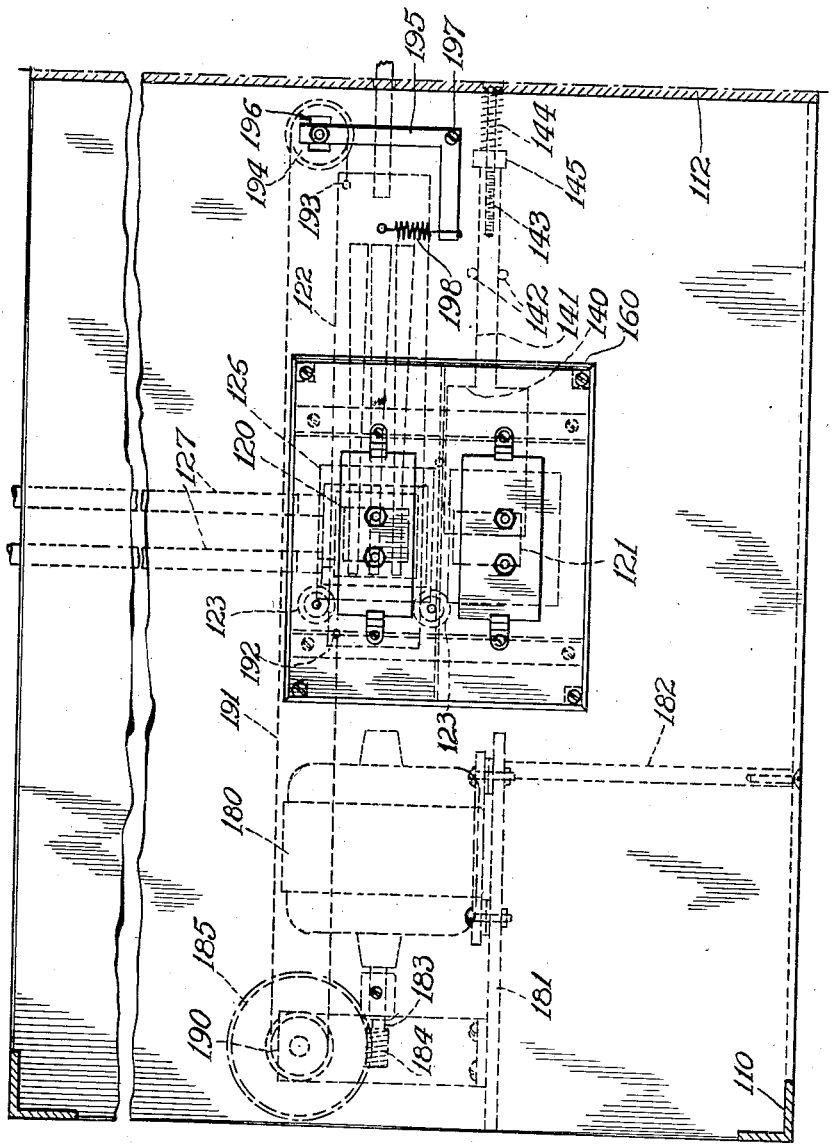
Figure 16:
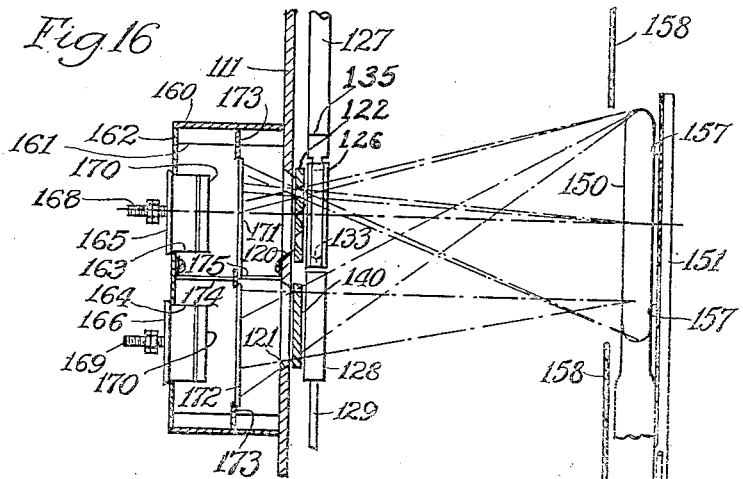

Referring to Figs. 13a, 14a, and 16 of the drawings, it will be seen that the vertical partition 111 has a pair of beveled-edged upper and lower openings or apertures 120 and 121, respectively, formed therein. A variable aperture, photometer member 122, constructed according to the theory described above in connection with Figs. 5 and 6, is shiftably supported on the right hand side (referring to Fig. 16) of the upper opening 120. The photometer member 122 is supported by a pair of upper and lower flanged rollers 123, and an arm 124 fastened to the right hand end thereof which passes through a hole in the vertical partition 112. The arm 124 is supported and guided between a pair of guide rollers 125 (Figs. 13b and 14b) mounted on the side of the partition 112.

A quartz-window ozone absorption cell 126 is mounted in front of the photometer member 122. The absorption cell 126 is supported by a pair of conduits 127 which also serve to conduct ozonated air to and from the absorption cell 126 for circulation therethrough. A dummy, quartz-window absorption cell 128 (Fig. 16) is supported in front of the lower window 121 by a pair of support members 129. Since the recorder is intended to measure the concentrations of ozone in air, it is not necessary to circulate air through the dummy absorption cell 128. However, if the concentration of a solute in a solvent were being measured, conduits would be connected with the dummy absorption cell 128 so as to circulate the clear solvent therethrough.

The rectangular separator 133 for the absorption cell 126 may be cut out of a brass plate and the two faces thereof ground so as to be parallel and as smooth as possible. The reduced diameter nipples 134 entering the top of the frame 133, may be soldered into the couplings 135 and the separator 133. No organic material should be present in the conduits 127 or the absorption cell 126 since such material will cause a rapid absorption of ozone and lead to an error in reading. The quartz-windows 136 may be firmly held in place to the opposite sides of the separator 133 by pinch clamps (not shown), and the cell may be sealed by molten paraffin painted around the edges thereof and allowed to solidify. The lower absorption cell 128 may be constructed in the same manner as the absorption cell 126.

In order to adjust the width of the lower window 121 so as to adjust the recorder for zero readings, a shiftable shutter 140 is provided having a supporting arm 141 (Fig. 14a) extending therefrom. The arm 141 is supported between a pair of capped pins 142 and the position of the shutter 140 may be adjusted by a screw 143 projecting into the internally threaded end of the arm 141. The head of the screw 143 extends through the partition 112 so that it may be reached with a screw driver and the position of the shutter 140 adjusted by turning the same. A spring 144 compressed between the partition 112 and a collar 145 on the end of the arm 141 serves to securely bias and hold the shutter 140 in position.

As shown in Figs. 13a, 15 and 16, an M-shaped mercury vapor lamp 150 may be used as a source of 253.7 mmu radiation. The lamp 150 may be of the type commercially available on the market as the Westinghouse "Sterilamp." The characteristics of the radiation of such a lamp have been described above in connection with the system of Fig. 2 of the drawings. The lamp 150 is supported on a backing member 151 by a pair of bands 152 (Fig. 15) which are spring tensioned by a pair of tension springs 153 inserted between the back 151 and retaining washers 154, as shown in Fig. 13a. The backing member 151 is supported from the bottom plate of the instrument box by a pair of uprights 155 fastened at their lower ends in a pair of blocks 156. The front face of the backing plate 151, which may be made of Bakelite, is smoked with magnesium oxide as indicated at 157 so as to substantially increase the amount of 253.7 mmu radiation radiated to the photometer part of the instrument. An opaque metal screen 158 (Figs. 15 and 16) is placed around the lamp 150 so as to block out all ultraviolet rays originating in the light source excepting those which proceed to the photometer assembly. The purpose of the screen 158 is to prevent unnecessary deterioration of wire coverings and other organic material in the light source compartment 115.

Referring again to Figs. 13a, 14a, and 16 of the drawings, it will be seen that the light conversion and photocell system is mounted as a unit on the partition 111 on the opposite side thereof from the photometer member 122 and the absorption cells 126 and 128. The unit is enclosed in an outside band 160 fitting over four square posts 161 which project from the partition 111. The front of the box is closed by a plate 162 having openings to accommodate a pair of upper and lower photocells 163 and 164, respectively. The photocells 163 and 164 are held in place in the plate 162 by the flanges 165 and 166 thereof which engage the plate 162, and two sets of clips 167 (Fig. 13a). The photocells 163 and 164 are of the blocking-layer, iron-selenium type. A pair of terminals 168 and 169 project from the rear of each of the photocells 163 and 164, respectively.

Each of the photocells 163 and 164 is covered with a red filter 170. The absorption properties of the filters 170 correspond to those of the red filters 18 described in connection with Fig. 2 of the drawings. As stated, these filters may be of the type known as Wratten No. 25.

A pair of fluorescent glass plates 171 and 172 are mounted in front of each of the photocells 163 and 164, respectively, and supported in the thin metal frame 173. The fluorescent plates 171 and 172 are coated with a film or deposit of cadmium borate phosphor and have the excitation characteristics described in connection with the fluorescent plate 17 of Fig. 2 of the drawings. Horizontal separators 174 and 175 (Fig. 16) are provided in the unit to prevent fluorescent light from either of the fluorescent plates 171 and 172 from reaching the photocell 163 or 164 associated with the other fluorescent plate. The interior surfaces of the enclosing members 160 and 162 and the surfaces of the frame 173 and separators 174 and 175 should be painted in flat black so as to minimize the effects of stray light.

From Fig. 16, it will be noted that the position of the mercury vapor lamp 150 is so adjusted that the center thereof is at approximately the same elevation as the center of the upper absorption cell 126 and the photometer, whereas the dummy absorption cell 128 is arranged at some distance (approximately 2 inches) below the line of centers of the lamp 150 and the photometer. This arrangement is made so as to obtain good photometric accuracy since the radiation should pass through the absorption cell 126 and photometer in as nearly parallel rays as possible.

On the other hand, it is not a matter of importance if the radiation from the lamp 150 strikes the lower fluorescent plate 172 at an oblique angle after passing through the dummy absorption cell 128, and the lower window 121. This is due to the fact that it is only necessary that the percentage change in light flux passing through the window 121 and incident upon the lower fluorescent plate 172 due to change in output from the lamp 150, be the same as for the corresponding percentage change in flux passing through the absorption cell 126, the photometer, and incident upon the upper fluorescent plate 171.

There has been found to be an optimum separation between the upper fluorescent plate 171 and the photometer member 122. This optimum separation eliminates error and the necessity for a perfect uniformity of the coating of cadmium borate phosphor on the plate. This will be understood on reference to Fig. 16 where it will be seen that there is a wide divergence or spread of the rays passing through any one of the three narrow elongated openings in the photometer member 122. Thus, the diagrammatic rays fan out in passing through the photometer member 122, so as to cover approximately one-half of the area of the fluorescent screen or plate 171. This wide distribution and overlapping of the rays serves to reduce error due to variation in thickness of the film of cadmium borate phosphor.

The reversible motor 180 for shifting the photometer member 122 in opposite directions, is shown in Figs. 13a and 14b mounted upon a platform 181 supported by posts 182 extending upwardly from the bottom of the instrument box. The armature shaft 183 extends from the left hand side of the motor 180 and carries a worm 184 which engages and drives a worm wheel 185. The worm wheel 185 is mounted on a horizontal shaft 186 supported at one end in a bearing 187 and at the other end in a bearing in the vertical partition 111. A pulley 190 is secured to the shaft 186 adjacent the vertical partition 111 over which a driving cord 191 runs. One end of the cord 191 is secured to the upper left hand corner of the photometer member 122 as indicated at 192, while the other end of the cord is secured to the upper right hand corner of the photometer member 122 as indicated at 193. The driving cord 191 passes from 192 around the pulley 190 and thence around an idling pulley 194 carried on a pin projecting from the upper end of an L-shaped lever 195. The pin on which the pulley 194 is supported passes through a window 196 cut through the vertical partition 111, and the lever 195 is pivotally supported to the partition 111 at 197. A spring 198 serves to bias the idling pulley 194 toward the right and keep the cord 191 under a tension substantially greater than that required to move the photometer plate 122 and the recording pen or stylus 200 (Fig. 13b). In this manner, friction is minimized and dimensional changes in the length of the driving cord 191 are automatically compensated for.

Referring to Figs. 13b and 14b, for a description of the recording apparatus, it will be seen that a synchronous motor 201 is mounted on top of the rectifier compartment 118. A small pinion gear 202 (Fig. 14b) is carried on the drive shaft of the motor 201 and meshes with a large gear wheel 203 mounted on one end of a shaft 204. The left hand end of the shaft 204 is journaled in a bracket 205 which also supports the synchronous motor 201, and the right hand end is journaled in a block 206 carried on a bracket 207. The shaft 204 also carries a worm 208 which serves to drive a worm wheel 210 keyed to the reduced end 211 (Fig. 13b), of a stub shaft 212. The stub shaft 212 is journaled in a bearing 213 carried on top of the bracket 207 as shown.

A collar member 214 having a large diameter flange 215 is carried on the front end of the shaft 212. The flange 215 serves as a back support to which a chart disc 216 is held. The chart disc 216 fits over the end of the shaft 212 and may be secured to the flange 215 by screws passing therethrough. Chart paper may be held against the chart disc 216 by a large nut 217. A thin metal plate 220 having a large circular opening therein to accommodate the chart disc 216 is vertically supported around the disc 216. Ears or tabs 221 are bent out from the thin sheet 220 at different positions therearound and serve to retain a chart paper 222 in vertical position on the disc 216.

The synchronous motor 201 drives the chart disc 216 at a constant speed and a record of ozone concentration is made thereon by the stylus 223 of the recording pen 200. The stylus 223 is carried in a receiver 224 having a removable cap 225. A weak spring 226 within the receiver 224 serves to press the stylus 223 gently against the chart paper on the chart disc 216. The recording pen 200 is adjustably mounted on the end of the square arm 224 by a pin 227. The pin 227 is adjustable within a socket in the end of the arm 224 and may be fastened in position by a set screw 228.

In order that the ozone concentration may be conveniently read at any time, a scale 229 (Fig. 14b) is supported beneath the arm 124, and a pointer 40 is carried below the arm 124 so as to pass over the divisions of the scale 229. The scale 229 is calibrated in percentage ozone concentration from 0.0 to 1.0 per cent, as shown.

The electrical system first used in my ozone concentration recorder is shown in Fig. 17 of the drawings, to which reference may be had for a description thereof. The recording instrument may be energized from 115-volt alternating current source, as indicated. The synchronous motor 201 which drives the chart disc 216 of the recorder is connected for energization with the 115-volt line through a toggle switch 230 so that it may be controlled independently of the other elements in the apparatus. The mercury vapor lamp 150 is connected across the secondary 231 of a step-up transformer 232. The primary 233 of this transformer is connected across the 115-volt line through a toggle switch 234, as shown.

The blocking-layer photocells 163 and 164 (Fig. 16) are connected in one branch of an electrical bridge circuit corresponding substantially to the electrical bridge described in connection with Fig. 12. One branch of the bridge comprises the two photocells 163 and 164 interconnected in series circuit relation by a resistor 235, and the other branch comprises a potentiometer type rheostat 236. The two branches of the bridge are connected in parallel across the terminals of the secondary winding 237 of a step-down transformer 238. The primary winding 239 is connected for energization across the 115-volt line, as shown. The transformer 238 is approximately the size and capacity of a small door-bell ringing transformer, and a secondary 237 consists of only a few turns so that the voltage V impressed across the bridge circuit will be in the order of 0.25 volt. Since the photocells 163 and 164 cannot ordinarily be perfectly matched for impedance, an adjustable resistor 240 and a variable capacitor 241 are connected in shunt circuit relation with at least one of the photocells so as to balance them for difference in internal resistance and capacitance. The photocells 163 and 164 may be thus balanced for internal resistance and capacitance by proper adjustment of the resistor 240 and capacitor 241.

The input of an electronic amplifier, indicated diagrammatically at 245, is connected across the electrical mid-points of the bridge circuit, as indicated. The amplifier 245 may be energized from the 115-volt current source through a pair of conductors or leads 246 and 247. The output of the amplifier 245 is capacitively coupled to the control elements or grids 248 and 249 of a pair of gas-filled electric valves 250 and 251. The tubes 250 and 251 are of the four-element type and are presently classified as FG-98 (General Electric). The grid bias of the control elements 248 and 249 may be adjusted from a "B" battery indicated diagrammatically at 252, through suitable adjustable resistance. The heated filaments 256 and 257 of the electric valves are connected for energization with the secondary 258 of a transformer indicated generally at 259.

One of the field coils 260 of the reversible motor 180 is connected in series circuit relation with the electric valve 250, while the other field coil 261 is connected in series circuit relation with the other electric valve 251. As will be seen, the circuit for the field coil 260 is completed through one-half of the secondary winding 262 of the transformer 259, the armature of the motor 180, and the tube 250, the armature being connected to the center-tap of the secondary winding 262. The circuit for the field coil 261 is completed through the other half of the secondary 262, the armature of the motor 180, and the other tube 251. The primary winding 263 of the transformer 259 is connected for energization across the 115-volt source, as shown. A toggle switch 264 is provided in the 115-volt line which serves to control the energization of the recording instrument except for the "Sterilamp" lamp 150 and the synchronous recorder motor 201.

The fourth elements 265 and 266 of the tubes 250 and 251 serve to give steadier operation of the electrical system. It will be seen that the ground output terminal of the amplifier 245, the fourth tube elements 265 and 266, and the center taps of the secondary transformer windings 258 and 262 are interconnected or grounded.

In operation of my ozone concentration recorder, the electrical circuit control system is first adjusted, conveniently with the help of an oscilloscope. With the mercury vapor lamp 150 turned off, the electrical bridge circuit including the photocells 163 and 164 is balanced so as to obtain a balanced residual wave form as described in connection with Figs. 10 and 11 of the drawings. Then, the mercury vapor lamp 150 is turned on and with the absorption cell 126 entirely free of ozone, the width of the lower window 121 is adjusted with the shutter 140 so that the system including the reversible motor 180 is balanced when the photometer member 122 is in its zero position. As a check (probably necessary only in the original test of the instrument) the intensity or output of radiation from the vapor lamp 150 is varied through wide limits so as to ascertain that the recorder gives a constant reading in spite of these variations.

After the recorder has been thus initially adjusted, the ozone-air mixture is circulated through the absorption cell 126 by suitable pumping apparatus. As 253.7 mmu radiation is absorbed by the ozone on passing through the cell 126, the system becomes unbalanced and one of the tubes 250 or 251 will fire over a longer portion of the cycle than the other. Accordingly, the reversible motor 180 will rotate in such a direction as to shift the photometer member 122 to a position permitting more 253.7 mmu radiation to pass and thereby bring the system back into balance. Conversely, in the event that the concentration of ozone in the absorption cell 126 decreases, thereby permitting an increased amount of 253.7 mmu radiation to pass, the firing period of the tubes 250 and 251 will again become unbalanced, but in an opposite direction, so as to rotate the motor 150 in an opposite direction. In turn, the photometer member 122 will be shifted so as to decrease the amount of radiation passing through the photometer and bring the system back in balance.

As described, the motion of the variable aperture, photometer member 122 in following the concentration of ozone in the absorption cell 126 is translated to the recording pen 200. In this manner, the pen makes a record of the ozone concentration on the chart paper 222 (Fig. 14b).

Although my ozone concentration recorder, as described above, operated satisfactorily in a practical manner, it was found that even much more satisfactory operation of the recorder could be obtained by modifying the electrical bridge of the electrical control system of Fig. 17. This modification consisted in substituting light-sensitive tubes or photocells of the photo-emissive type (vacuum or gas-filled phototubes) for the photocells 163 and 164 (Fig. 17) which, as stated, were of the blocking-layer type.

The modified bridge circuit is shown diagrammatically in Fig. 18 of the drawings as electrically interconnected between a transformer 270 and the amplifier 245 (Fig. 17). The transformer 270 corresponds in function to the transformer 238 (Fig. 17), but the transformer ratio thereof is greater than that of the transformer 238 so as to impress a greater voltage across the bridge circuit. Whereas it was found that the bridge circuit of Fig. 17 had its greater sensitivity when a voltage in the order of 0.250 was impressed across it, it has been found that the bridge circuit of Fig. 18 should have an impressed voltage in the order of 3 to 5 volts.

One branch of the modified bridge circuit of Fig. 18 is provided with a potentiometer type rheostat 273 while the other branch of the bridge is comprised of two phototubes 274 and 275 of the photo-emissive type interconnected in series circuit relation. A small variable capacitor 277 is connected in shunt relationship with each of the phototubes 274 and 275, as shown, so that any slight difference in capacitance of the two tubes may be corrected. The input of the electronic amplifier 245 is connected across the electrical mid-point of the bridge circuit, as indicated. Except for the modification of the electrical bridge as described, the electrical control system by which the Thyratrons or gas-filled valves 250 and 251 are controlled is the same as the control system shown in Fig. 17.

The residual wave obtained with the bridge of Fig. 18 is very similar to that observed when blocking-layer photocells are employed (Fig. 11), although the dependence of the amplitude of the residual wave on light level is much stronger. When the phototubes 274 and 275 are in total darkness, the residual wave may be made zero; then, when the light level on the tubes is brought up and balanced, the residual wave comes into existence, and increases with increasing light level.

The use of phototubes of the photo-emissive type as described in connection with Fig. 18, has led to much more satisfactory operation of the recorder, since sensitivity is appreciably greater and the stability or freedom from drift has been greatly increased. Furthermore, it is easier to obtain phototubes of the photo-emissive type which are matched because it is only necessary that these tubes be similar in the current-voltage characteristic, whereas photocells of the blocking-layer type must match in current-voltage characteristic, internal resistance and capacitance.

As another modification of the electrical bridge of the invention, the photocells employed therein may be a pair of the early type selenium cells. This type of cell is of the photo-conductive type and involves ordinary conduction through a thin film of selenium, which exhibits a change in resistance when illuminated.

Although I have described an embodiment of my invention specifically adapted to measure and record concentrations of ozone in air, it will be understood that modifications and adjustments may be made so that by applying the same principles of invention, instruments may be made for measuring and recording concentrations of other gases and vapors, as well as certain solutes in solvents.

It will be understood that in apparatus of this nature, involving as it does a relatively large number of parts and elements organized into different systems, certain changes, modifications and other arrangements may be made without departing from the principles and scope of the invention. Accordingly, all matter described above or shown in the accompanying drawings is intended to be interpreted as illustrative and not in a limited sense.

I claim:

1. Means adapted to control the operation of electrical apparatus in response to small changes in light flux from a light source, comprising a gas filled valve having control and plate elements, an electrical bridge circuit having four legs, one pair of said legs each including an impedance device and the other pair each including a polarized photocell, one of the photocells being adapted to receive light flux from said light source, the legs of each pair being connected together in series circuit relation, said polarized photocells being connected with unlike electrodes connected together, and said pairs of legs being connected in parallel circuit relation, a low voltage source of alternating current connected across the parallel connected pairs of legs, a high voltage source of alternating current which is of the same frequency as, and which is in phase with, said low voltage source connected to said plate element, and means electrically connecting the control element of said gas filled valve across the common connection between said photocells and the common connection between said impedance devices whereby the firing of said valve will occur in response to changes in the wave form of the potential impressed across said common connections.

2. Means adapted to control the operation of electrical apparatus in response to small changes in light flux from one of two light sources not accompanied by similar changes in light flux from the other light source, comprising a gas filled valve having control and plate elements, an electrical bridge circuit having four legs, one pair of said legs each including an impedance device and the other pair each including a polarized photocell, one of the photocells being adapted to receive light flux from one of said light sources and the other photocell being adapted to receive light flux from the other of said light sources, the legs of each pair being connected together in series circuit relation, said polarized photocells being connected with unlike electrodes connected together, and said pairs of legs being connected in parallel circuit relation, a low voltage source of alternating current connected across the parallel-connected pairs of legs, a high voltage source of alternating current which is of the same frequency as, and which is in phase with, said low voltage source connected to said plate element, circuit balancing means comprising an adjustable impedance connected to at least one of said photocells, and an amplifier means, the output of which is connected to the control element of the gas-filled electric valve and the input of which is connected across the common connection between said photocells and the common connection between said impedance devices, whereby the firing of said valve will occur in response to predetermined changes in the wave form of the potential impressed across said common connections.

3. Means adapted to control the operation of electrical apparatus in response to small changes in light flux from one of two light sources not accompanied by similar changes in light flux from the other light source, comprising a gas filled valve having control and plate elements, an electrical bridge circuit having four legs, one pair of said legs each including an impedance device and the other pair each including a polarized photocell, one of the photocells being adapted to receive light flux from one of said light sources and the other photocell being adapted to receive light flux from the other of said light sources, the legs of each pair being connected together in series circuit relation, said polarized photocells being connected with unlike electrodes connected together, and said pairs of legs being connected in parallel circuit relation, a low voltage source of alternating current of the order of .25 to 5.0 volts connected across the parallel-connected pairs of legs, voltage adjusting means connected in circuit relation with said low voltage source of alternating current for adjusting the voltage across the parallel-connected pairs of legs, a high voltage source which is of the same frequency as, and which is in phase with, said low voltage source connected to said plate element, adjustable impedance means connected to at least one of said photocells, an electronic amplifier, circuit means connecting the input of the amplifier between the common connection between said photocells and the common connection between said impedance devices, and circuit means connecting the output of said amplifier to the control element of said electric valve.

4. An electrical control system comprising a bridge circuit having a pair of parallel connected branches, one of said branches comprising a pair of impedance devices connected in series and the other of said branches comprising a pair of polarized photocells connected in series with unlike electrodes connected together, a low voltage source of alternating current connected across said parallel branches, and a pair of output leads, one of which is connected to the common connection between said impedance devices and the other of which is connected to the common connection between said photocells, the impedances of said impedance devices being adjusted to effect substantial voltage balance in said bridge circuit whereby small variations in the light flux reaching either photocell will produce substantial changes in the wave form of the potential impressed upon said output leads.

5. An electrical control system comprising a bridge circuit having a pair of parallel connected branches, one of said branches comprising a pair of impedance devices connected in series and the other of said branches comprising a pair of polarized photocells connected in series with unlike electrodes connected together, a low voltage source of alternating current connected across the parallel branches of said bridge circuit, and a pair of output leads, one of which is connected to the common connection between said impedance devices and the other of which is connected to the common connection between said photocells, the alternating current potential applied to said parallel branches being of the order of about .25 to 5.0 volts, and the impedances of said impedance devices being adjusted to effect substantial voltage balance in said bridge circuit whereby small variations in the light flux reaching either photocell will produce substantial changes in the wave form of the potential impressed upon said output leads.

6. An electrical control system comprising a bridge circuit having a pair of parallel connected branches, one of said branches comprising a pair of impedance devices connected in series and the other of said branches comprising a pair of polarized photocells connected in series with unlike electrodes connected together, a low voltage source of alternating current connected across the parallel branches of said bridge circuit, circuit-balancing means comprising an adjustable impedance operatively connected to one of said photocells, and a pair of output leads, one of which is connected to the common connection between said impedance devices and the other of which is connected to the common connection between said photocells, the alternating current potential applied to said bridge circuit being of the order of about .25 to 5.0 volts, and the impedances of said impedance devices being adjusted to effect substantial voltage balance in said bridge circuit whereby small variations in the light flux reaching either photocell will produce substantial peaking of the potential impressed upon said output leads.

7. An electrical control system comprising a bridge circuit having a pair of parallel connected branches, one of said branches comprising a pair of impedance devices connected in series and the other of said branches comprising a pair of polarized photocells connected in series with unlike electrodes connected together, a low voltage source of alternating current connected across said parallel branches, a pair of output leads, one of which is connected to the common connection between said impedance devices and the other of which is connected to the common connection between said photocells, a pair of gas-filled valves, each having a plate and a control element, means for applying an alternating current potential which is of the same frequency as, and which is in phase with, said low voltage source to the plate elements of said valves, said plate elements being operated 180 electrical degrees apart, and means connecting the control elements of said valves to each other and to the output of said bridge circuit, the impedances of said impedance devices being adjusted to effect substantial voltage balance in said bridge circuit.

8. An electrical control system comprising a bridge circuit having a pair of parallel connected branches, one of said branches comprising a pair of impedance devices connected in series and the other of said branches comprising a pair of polarized photocells connected in series with unlike electrodes connected together, a low voltage source of alternating current connected across said parallel branches, a pair of output leads, one of which is connected to the common connection between said impedance devices and the other of which is connected to the common connection between said photocells, a pair of gas-filled valves, each having a plate and a control element, means for applying an alternating current potential which is of the same frequency as, and which is in phase with, said low voltage source to the plate elements of said valves, said plate elements being operated 180 electrical degrees apart, means connecting the control elements of said valves to each other, and a voltage amplifier the output of which is connected into the circuit of said interconnected control elements and the input of which is connected to said output leads bridged across said interconnected impedances and photocells, the impedances of said circuit being adjusted to effect voltage balance in said bridge circuit, whereby selective firing of one of said valves in response to increased relative illumination of a particular photocell is effected.

9. An electrical control system comprising a bridge circuit having a pair of parallel connected branches, one of said branches comprising a pair of resistances connected in series and the other of said branches comprising a pair of polarized photocells connected in series with unlike electrodes connected together, a low voltage source of alternating current connected to impress an alternating potential of about .25 to 5.0 volts across said parallel branches, a pair of output leads, one of which is connected to the common connection between said impedance devices and the other of which is connected to the common connection between said photocells, a pair of gas-filled valves, each having a plate and a control element, means for applying an alternating current potential which is of the same frequency as, and which is in phase with, said low voltage source to the plate elements of said valves, said plate elements being operated 180 electrical degrees apart, and means connecting the control elements of said valves to each other and to the output of said bridge circuit, said resistances being adjusted to effect substantial voltage balance in said bridge circuit, whereby selective firing of said valves in response to increased relative illumination of a particular photocell will be accomplished.

JOHANNES A. VAN den AKKER.